Oct. 30, 1928.
O. WITTEL
1,689,268
DIAPHRAGM ADJUSTING MECHANISM FOR CAMERAS
Filed May 5, 1927
3 Sheets-Sheet 1
FIG _ 1 _
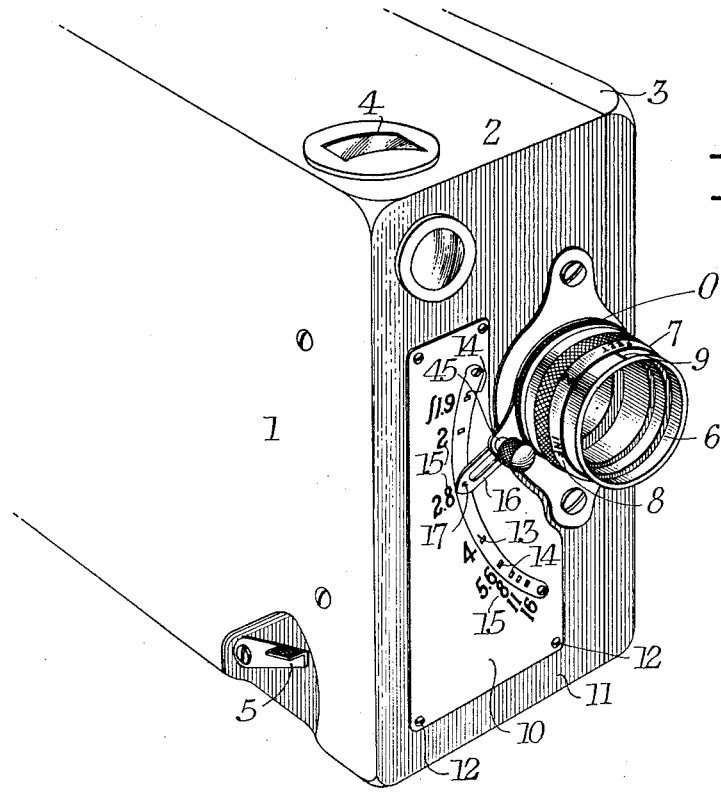
INVENTOR,
Otto Wittel
BY
ATTORNEYS.

Oct. 30, 1928.
O. WITTEL
DIAPHRAGM ADJUSTING MECHANISM FOR CAMERAS
Filed May 5, 1927 3 Sheets-Sheet 2
1,689,268
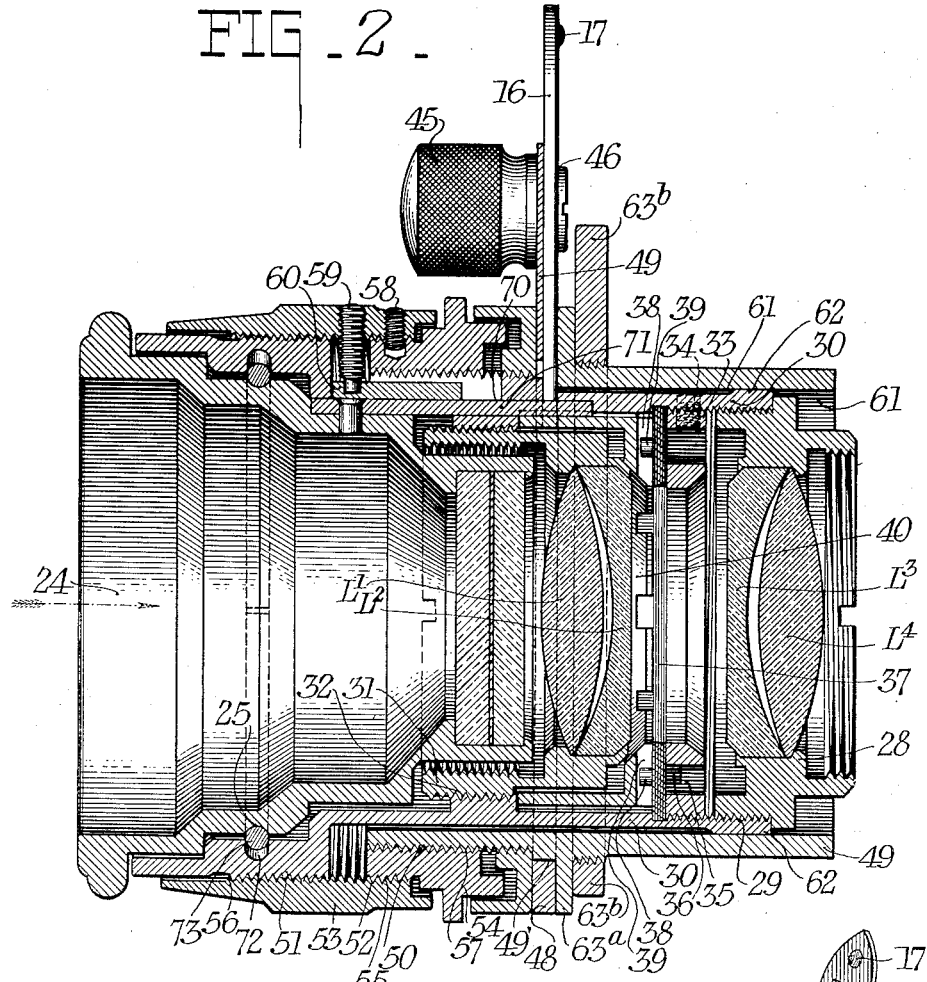
FIG_2_
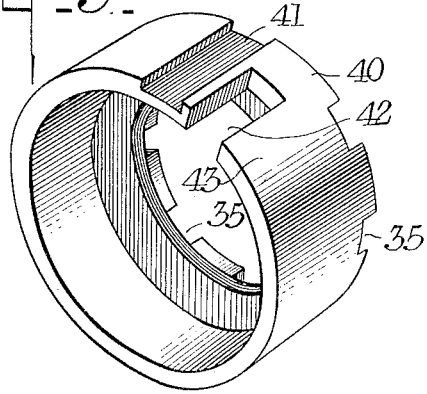
FIG_3_
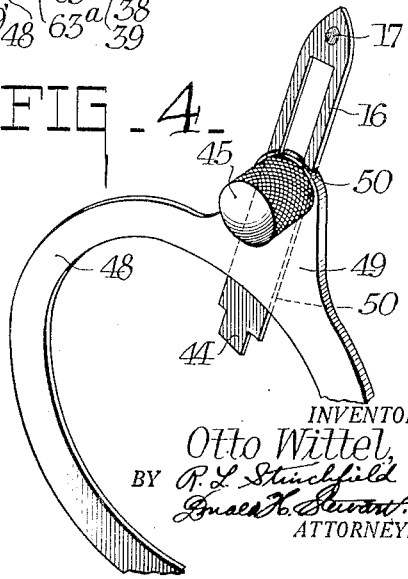
FIG_4_
INVENTOR,
Otto Wittel,
BY
ATTORNEYS.

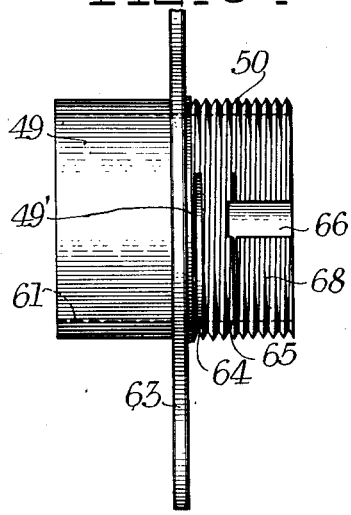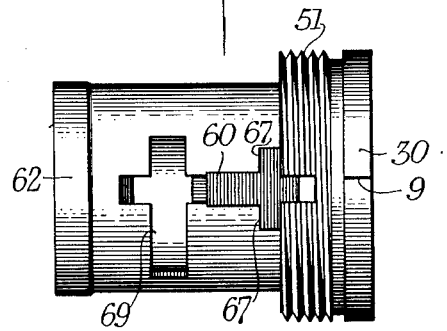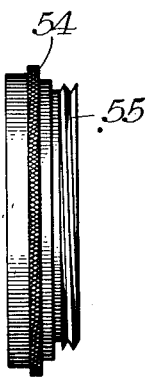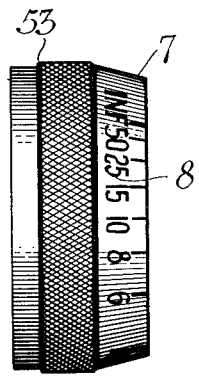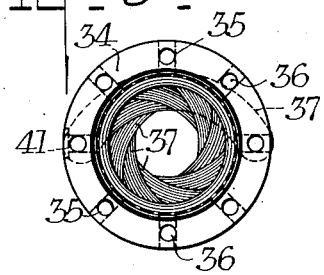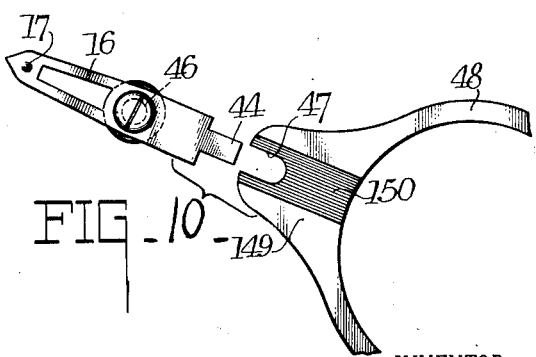

Patented Oct. 30, 1928.

1,689,268

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

DIAPHRAGM-ADJUSTING MECHANISM FOR CAMERAS.

Application filed May 5, 1927. Serial No. 189,131.

This invention relates to cameras and more particularly to diaphragm adjusting mechanism for cameras. One object is to provide an optical equipment for cameras including a movable lens mount and diaphragm, the diaphragm being controlled by an adjusting arm which is mounted to turn upon, but not to slide with the lens mount. Another object is to provide a movable connection between the diaphragm control lever and the diaphragm. Another object is to provide a snap latch adapted to hold the diaphragm lever in a set position. Another object is to provide suitable slot covering devices for the slots through which the diaphragm operating mechanism functions to exclude dirt and dust therefrom.

The mechanism for focussing the objecttive mount, as shown and described in this specification, is the subject matter of a separate application for focussing objective mount for cameras, Serial No. 189,132 filed May 5, 1927.

Coming now to the drawings wherein like reference characters denote like parts throughout.

Fig. 1 is a perspective view showing one form of a diaphragm adjusting mechanism for cameras constructed in accordance with and illustrating a preferred form of my invention;

Fig. 2 is a section through a preferred embodiment of the optical equipment for cameras shown in Fig. 1;

Fig. 3 is a perspective view of the diaphragm moving member;

Fig. 4 is a perspective view of the diaphragm adjusting ring and the diaphragm adjusting lever;

Fig. 5 is a side elevation of the lens tube support;

Fig. 6 is a similar view of the lens tube;

Figs. 7 and 8 are side elevations of the two parts which form the focussing ring for the objective;

Fig. 9 is a front plan view of the diaphragm;

Fig. 10 is a rear plan view of the diaphragm adjusting lever.

As shown in Fig. 1, my diaphragm mechanism for cameras is mounted with an objective designated broadly by 0 is shown as mounted upon a camera 1, which is of a well known type of motion picture camera. This camera may comprise a body portion 2 having a removable side 3 for loading the camera, a finder 4 and a trigger 5, by which the power spring (not shown) may be operated to take motion pictures.

In Fig. 1 an objective is contained in the barrel 6, and this may be focussed by turning a focussing ring 7, which bears on its periphery a scale 8 which may be brought opposite a locating line 9 to adjust the objective to the desired focal distance.

The diaphragm scale plate 10 may be fastened to the front 11 of the camera in any suitable way as by screws 12. This scale plate is preferably provided with an arcuate path 13 provided with a series of cutouts 14 opposite the different diaphragm opening designating numerals 15. The diaphragm adjusting lever 16 is provided with a protuberance 17 adapted to snap in and be frictionally held by these cutouts.

Referring to Fig. 2, the structure of the objective mount is as follows: The objective comprises four lenses $L^1$, $L^2$, $L^3$, and $L^4$. The last two mentioned lenses are contained in a lens cell 28 which is screwed into at 29 the objective mount 30. Lenses $L^1$ and $L^2$ are carried by lens cell 31 screwed into at 32 the objective mount 30. These lens cells are held in a fixed position.

The diaphragm consists of a fixed diaphragm ring 33, which is attached by screw 34 to the objective mount 30. This ring includes a series of apertures 35 (see Fig. 9) which support pins 36 extending rearwardly from the diaphragm leaves 37. Each diaphragm leaf has a second pin 38 extending in an opposite direction into a slot 39 of movable diaphragm cell 40 as shown in Fig. 2. The diaphragm structure above described is well known in the art.

Referring to Fig. 3 which shows the movable diaphragm cell 40, this cell is mounted to turn in the objective mount 30. Cell 40 is provided with a groove 41 which extends across the cell and a slot 42 which extends through a portion of the flange 43 of the cell. In order to turn member 40, there is a diaphragm operating lever 16 having an end 44 which passes into the slot 42. Member 16 is provided with an operating handle 45, this handle being in the form of a knurled nut which is attached to a screw 46, as best shown in Fig. 10 and is adapted by engaging the slot 47 to attach the operating lever 16 to a ring 48 which encircles the support 30 on shoulder 49, as best shown in Fig. 2. The ring 48 is provided with an offset 149 grooved at 150 to receive the operating lever 16, the groove 50 being of the same depth as the thickness of the metal from which the operating lever 16 is made. In other words, as shown in Fig. 4, when the operating lever is assembled, the outer surface will lie flush with the surface of the ring 48.

When the objective is focussed by moving the objective mount 30 relative to the support 49 as will be hereinafter more fully described, the diaphragm structure will, of course, also move. Since the diaphragm operating lever 16 and the ring 48 are mounted on the support, this structure will not move with the diaphragm. Lever 44, by projecting into slot 42, permits the relative sliding movement between the diaphragm and its operating lever. This structure is useful, because it permits the lever 16 to have a fixed relation with the scale plate 10 and permits it to be arranged so that the protuberance 17 will always be in frictional engagement with the scale plate, so that it may snap into the cutouts 13.

In order to move the objective mount 30 with respect to the support 49, I have provided two threaded areas 50 and 51, these threads being right and left hand. Thread 50 forms a part of the support 49. Thread 51 forms a part of the objective mount 30. A focussing ring designated as 52 is made of two parts 53 and 54, which, as best shown in Fig. 2, are connected by screw thread 55. This focussing ring is provided with two thread areas 56 and 57, one thread being right hand and the other left hand, the two threads engaging the threads 50 and 51. The lens is initially adjusted by turning the two sections of the focussing ring relative to each other, after which they are fastened together by a set screw 58. When so fastened they move as a unit, and, as the focussing ring is turned, the objective is moved with respect to its support. A screw 59 extends downwardly into the path of a key 60 carried by the objective carrier 30, so that more than one revolution of the focussing ring is thus prevented.

As best shown in Figs. 5 and 6, the structure of the focussing mechanism is as follows: In Fig. 5 the support 49 is shown as consisting of a barrel shaped member having a smooth inside bore 61 adapted to receive the slide pad 62 of the objective carrier 30. Member 49 in the form shown in Fig. 5 is provided with a flange 63 which may be attached to the camera wall 1. In the embodiment shown in Fig. 2, this flange, for convenience, is divided into two parts 63ª and 63ᵇ, these being threaded together and 63ᵇ being permanently attached to the camera wall. This facilitates removing the optical unit.

Threaded portion 50 of member 49 is slotted at 64 and at 65, these slots being preferably parallel and the latter slot intersecting a third slot 66. Slot 66 provides an opening which the web 60 on member 30 may engage, so that the object carrier may freely slide but may not turn with respect to the support 49. The shoulders 67 of the web 60 limit the inward motion of member 30 with respect to the support 49.

Slot 64 is provided so that the diaphragm lever operating extension 44 may turn axially with respect to the support, this slot being normally covered by the ring 48. Slot 65 permits an area 68 of the thread 50 to be sprung outwardly to create a tension on the focussing ring 52, so that it may remain in any set position.

Referring to Fig. 6, the objective carrier is provided with a slot 69 which is of sufficient length to permit the rotative movement of the diaphragm lever 16 necessary to adjust the diaphragm to different openings.

As shown in Fig. 2, a groove 70 is formed in the objective mount 30, this groove being formed in the smooth inside bore 61. When the groove 41 of the movable diaphragm member registers with the groove 70 of the objective mount, an attachment locating arm 71 may pass into the slot thus formed. Obviously, when the slots 41 and 70 are in registration, the diaphragm opening is at a predetermined setting. In Fig. 2, I have shown this setting to be fully open, as, with the color filter 24 in the place, this is necessary.

As indicated in Fig. 6, a color filter may be used, here shown as a cylindrical member having an outer portion 24 and a filter element 26 between glass plates 27.

An arm 71 is attached to the mount and this arm controls the position of the diaphragm mount as fully explained in my application, Serial No. 245,904, filed Jan. 11, 1928, which contains subject matter divided out from this present application.

There is a groove 72 on the inside of the objective carrier and in this groove there is a split ring 73, this ring serving as a snap latch to hold a lens attachment 24 in place by snapping into a groove 25 in the attachment. Unless the arm 71 passes into the opening formed in the grooves 41—70, the split ring cannot engage in groove 24, so that the lens attachment cannot be placed in front of the objective. This makes it necessary to properly adjust the diaphragm before the attachment can be properly located.

Having thus described my invention, what I claim as new and desire to secure by Letters Patent is:

1. In an optical equipment for cameras, the combination with a support, of a slotted objective mount slidably carried thereby, an axially slotted diaphragm member carried by the mount and a diaphragm adjusting member projecting into the two slots whereby longitudinal movement of the diaphragm relative to the diaphragm is permitted, and the diaphragm and adjusting member may be radially turned together.

2. In an optical equipment for cameras, the combination with a slotted support, of a mount movably carried therein, an adjusting arm projecting through the slot, a diaphragm member engaged by the adjusting arm, and a ring carrying the arm and covering the slot.

3. In an optical equipment for cameras, the combination with a slotted support, of a mount movably carried therein, a diaphragm carried by the movable mount, said diaphragm consisting of fixed and movable annular diaphragm blade supporting members and a diaphragm adjusting lever having a slidable connection with the movable annular diaphragm blade supporting member.

4. In an optical equipment for cameras, the combination with a slotted support, of an objective mount movably carried thereby, an iris diaphragm carried by the mount, a ring covering the slot in the support, and an arm extending down from the ring through the slot, and having a slidable connection with the diaphragm, and constituting means for moving the diaphragm ring.

5. In an optical unit for cameras, the combination with a slotted support, of a mount for objectives mounted to move thereon, a diaphragm structure carried by the mount, a diaphragm operating key projecting from the diaphragm structure through the slot, a ring around the support covering the slot and being of greater thickness than the width of the slot and key, said ring being slotted to receive the key.

6. In an optical unit for cameras, the combination with a slotted support, of a mount for objectives, mounted to move thereon, a diaphragm structure carried by the mount, a diaphragm ring mounted on the support and adapted to cover the slot therein, said ring having an opening therethrough, a key contacting with and adapted to operate the diaphragm and projecting through the opening in the ring and through the slot, whereby a dust tight structure is obtained.

7. In an optical unit for cameras, the combination with a slotted support, of a mount for objectives, mounted to move thereon, a diaphragm structure carried by the mount, a diaphragm ring mounted on the support and adapted to cover the slot therein, said ring having an opening therethrough, a key contacting with and adapted to operate the diaphragm and projecting through the opening in the ring and through the slot, and means for removably attaching the key to the diaphragm ring.

Signed at Rochester, New York this 29th day of April 1927.

OTTO WITTEL.